(12) United States Patent
Yamada et al.

(10) Patent No.: US 10,649,296 B2
(45) Date of Patent: May 12, 2020

(54) LIQUID CRYSTAL DISPLAY DEVICE

(71) Applicant: SHARP KABUSHIKI KAISHA, Sakai, Osaka (JP)

(72) Inventors: Takayuki Yamada, Sakai (JP); Takehiro Murao, Sakai (JP)

(73) Assignee: SHARP KABUSHIKI KAISHA, Saki, Osaka (JP)

( * ) Notice: Subject to any disclaimer, the term of this patent is extended or adjusted under 35 U.S.C. 154(b) by 0 days.

(21) Appl. No.: 16/096,663

(22) PCT Filed: May 12, 2016

(86) PCT No.: PCT/JP2016/064147
§ 371 (c)(1),
(2) Date: Oct. 25, 2018

(87) PCT Pub. No.: WO2017/195323
PCT Pub. Date: Nov. 16, 2017

(65) Prior Publication Data
US 2019/0137802 A1 May 9, 2019

(51) Int. Cl.
*G02F 1/1368* (2006.01)
*H04N 13/324* (2018.01)
*H04N 13/312* (2018.01)
*G02F 1/1343* (2006.01)
*G02F 1/1335* (2006.01)
(Continued)

(52) U.S. Cl.
CPC ...... *G02F 1/1368* (2013.01); *G02F 1/134309* (2013.01); *H04N 13/312* (2018.05); *H04N 13/324* (2018.05); *G02B 30/00* (2020.01); *G02F 1/1362* (2013.01); *G02F 1/133512* (2013.01);
(Continued)

(58) Field of Classification Search
CPC ............. G02F 1/134309; G02F 1/1368; G02F 1/1335; G02F 2001/136222; G02F 2201/123
See application file for complete search history.

(56) References Cited

U.S. PATENT DOCUMENTS 5,414,547 A * 5/1995 Matsuo ............. G02F 1/136209
349/44
5,444,012 A * 8/1995 Yoshizumi .......... H01L 23/5256
438/6
(Continued)

FOREIGN PATENT DOCUMENTS

JP 2005-321449 A 11/2005

*Primary Examiner* — Hoan C Nguyen
(74) *Attorney, Agent, or Firm* — ScienBiziP, P.C.

(57) ABSTRACT

The present invention provides a liquid crystal display device capable of performing high-definition and high-luminance dual view display. A liquid crystal display device of the present invention, includes: a first substrate; a second substrate disposed facing the first substrate; a liquid crystal layer disposed between the first substrate and the second substrate; a barrier layer formed on a surface side of the first substrate; a TFT element layer formed on the barrier layer; a pixel electrode laminated on the TFT element layer; a color filter disposed on a liquid crystal layer side of the second substrate; and a counter electrode disposed between the color filter and the liquid crystal layer. The barrier layer includes a barrier pattern formed on the first substrate and an intermediate layer with which the barrier pattern is covered.

4 Claims, 12 Drawing Sheets

(51) Int. Cl.
*G02F 1/1362* (2006.01)
*G02B 30/00* (2020.01)

(52) U.S. Cl.
CPC .......... *G02F 2001/136222* (2013.01); *G02F 2201/123* (2013.01)

(56) References Cited

U.S. PATENT DOCUMENTS

| | | | | |
|---|---|---|---|---|
| 6,122,027 A | * | 9/2000 | Ogawa | G02F 1/133345 349/113 |
| 2002/0109811 A1 | * | 8/2002 | Park | G02F 1/136227 349/113 |
| 2016/0131955 A1 | * | 5/2016 | Sakai | G02F 1/133553 349/43 |

* cited by examiner

LIQUID CRYSTAL DISPLAY DEVICE

TECHNICAL FIELD

The present invention relates to a liquid crystal display device.

BACKGROUND ART

In dual view display capable of displaying two different types of images in a left-right direction, left and right images are separated by bonding a barrier substrate on which a barrier pattern is drawn onto a liquid crystal panel with a UV curable resin under existing conditions. An image separation angle is determined by a relationship between a pixel pitch and a distance between a pixel of the liquid crystal panel and the barrier pattern. Hereinafter, the distance between the pixel of the liquid crystal panel and the barrier pattern may be referred to as a gap.

If a separation angle is desired to be constant, it is necessary to reduce the gap when the pixel pitch is finely formed. Specifically, it is necessary to reduce the thickness of the color filter or UV curable resin.

Also, the coating of the UV curable resin for use in bonding the barrier substrate onto the liquid crystal panel is applied with a thickness of about 50 μm. For thinner coating, it is necessary to develop a new UV curable resin material and develop a coating process for thin coating. Besides, in the case of a thin coating film, quality aspects such as uneven resin curing and adhesion reliability become problematic. In consideration thereof, the thickness of the coating film is at least about 30 μm as a limit.

At present, the thickness of the color filter substrate is designed to be 50 to 100 μm.

To further reduce a thickness of the color filter substrate, the development of a glass etching process for making the color filter substrate ultra-thin, the development of a process of bonding the barrier substrate to an ultra-thin type color filter surface, panel handling before bonding on production, a yield due to ultra-thin thickness formation of a color filter, and the like become problematic. Therefore, under existing conditions, the limit is about 50 μm. Also, because the left and right images are separated by a barrier pattern having a light blocking effect, there is a situation in which light cannot be used effectively.

The gap for determining the separation angle between the right and left images is determined by a total thickness of a thickness of the color filter substrate, a thickness of the barrier substrate and a thickness of the UV curable resin. Thus, it is difficult to achieve high definition. Also, a light blocking material such as a black matrix is used as the barrier pattern of the barrier substrate. Because the black matrix blocks light, high luminance cannot be achieved.

In Patent Literature 1, a liquid crystal display panel in which a distance adjustment layer including a film made of an acrylic resin, an epoxy resin or a polymethacrylic resin and a light blocking layer are formed on a color filter substrate is disclosed. Thereby, it is possible to separate a slit layer and a liquid crystal layer by a predetermined distance in the step of manufacturing the liquid crystal display panel itself without bonding a separate barrier substrate.

PRIOR ART DOCUMENT

Patent Document

[Patent Document 1] Japanese Unexamined Patent Application, First Publication No. 2005-321449

SUMMARY OF THE INVENTION

Problem to be Solved by the Invention

In the configuration described in the above-mentioned Patent Literature 1, dual view display is possible without bonding separate barrier substrates, but no effective use of light is specified. Therefore, it is not possible to solve the problem of light utilization efficiency which is a problem of dual view display.

In an aspect of the present invention which has been made in view of the above-mentioned problems of the conventional technology, it is possible to provide a liquid crystal display device capable of performing high-definition and high-luminance dual view display.

Means for Solving the Problems

A liquid crystal display device according to one aspect of the present invention, includes: a first substrate; a barrier layer formed on a surface side of the first substrate; a TFT element layer formed on the barrier layer; a pixel electrode laminated on the TFT element layer; a second substrate disposed facing the first substrate via the first substrate; a color filter disposed on a liquid crystal layer side of the second substrate; and a counter electrode disposed between the color filter and the liquid crystal layer. The barrier layer includes a barrier pattern formed on the first substrate and an intermediate layer with which the barrier pattern is covered.

In addition, in the liquid crystal display device according to one aspect of the present invention, the intermediate layer may function as an adjustment layer configured to adjust a distance between the color filter and the barrier pattern.

In addition, in the liquid crystal display device according to one aspect of the present invention, the barrier pattern may have a plurality of barrier parts arranged with a predetermined pitch. A width of the barrier part in an arrangement direction may be wider than a pixel pitch.

In addition, in the liquid crystal display device according to one aspect of the present invention, the barrier pitch of the plurality of barrier parts may be substantially twice the pixel pitch.

In addition, in the liquid crystal display device according to one aspect of the present invention, the barrier pattern may have a light absorbing effect or a light reflecting effect.

In addition, in the liquid crystal display device according to one aspect of the present invention, the liquid crystal display device may include: a first barrier pattern having a light reflecting effect; and a second barrier pattern having a weaker light reflecting effect than the first barrier pattern. The first barrier pattern and the second barrier pattern are laminated in this order on the first substrate.

Effect of the Invention

As described above, according to an aspect of the present invention, it is possible to provide a liquid crystal display device capable of performing high-definition and high-luminance dual view display.

EMBODIMENTS FOR CARRYING OUT THE INVENTION

Hereinafter, embodiments of the present invention will be described with reference to the drawings. In each drawing used in the following description, the scale of each member is appropriately changed to a size in which each member is recognizable.

First Embodiment

In the present embodiment, an example of a liquid crystal display device which is a dual view display on which two different types of images can be displayed in a left-right direction and which corresponds to high-definition video display (5760 pixels×2160 pixels) will be described.

Figure 1:
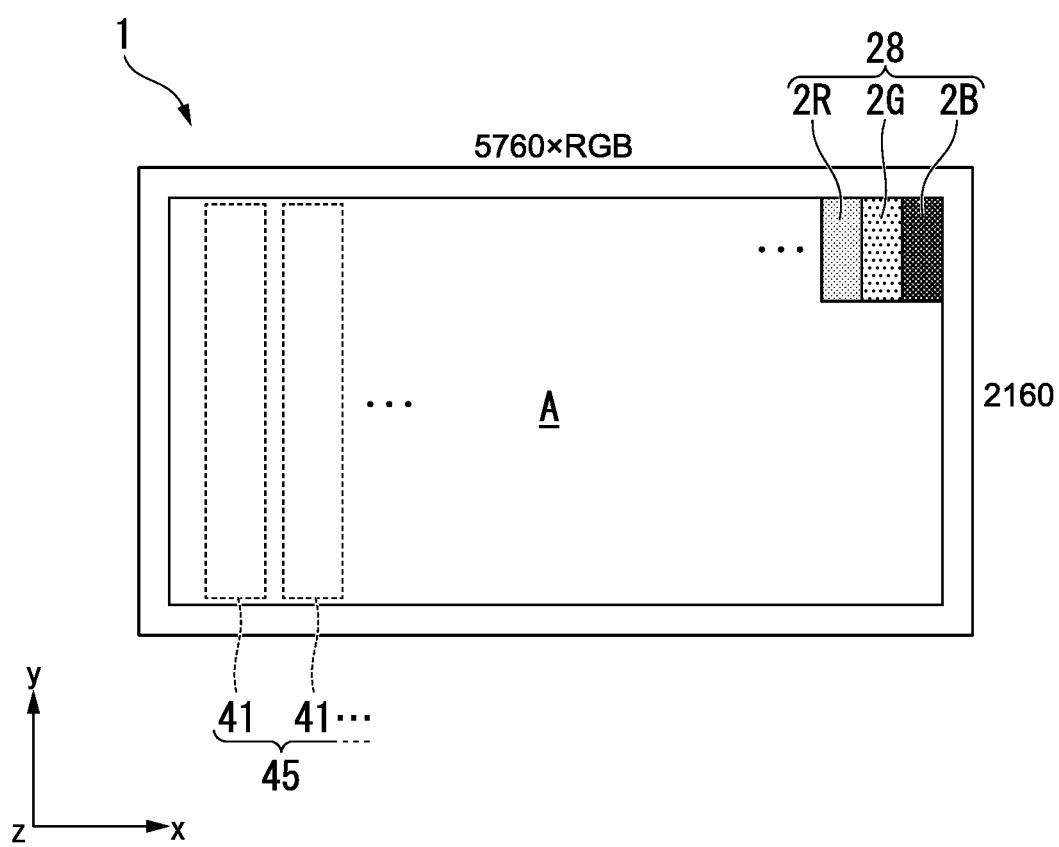
FIG. 1 is a front view illustrating a schematic configuration of a liquid crystal display device according to a first embodiment of the present invention.

FIG. 1 is a front view illustrating a schematic configuration of a liquid crystal display device according to a first embodiment of the present invention.

As illustrated in FIG. 1, a liquid crystal display device 1 includes a liquid crystal panel 2 having a large number of pixels 28 disposed in a display area A in a left-right direction (an x-direction). One pixel 28 includes a red subpixel 2R, a green subpixel 2G, and a blue subpixel 2B sequentially disposed in the display area A in the left-right direction.

A barrier pattern 45 for enabling dual view display is provided in the liquid crystal panel 2. In this barrier pattern 45, a large number of barrier parts 41 extending in the display area A in an up-down direction (a y-direction) are disposed with a predetermined pitch in the display area A in the left-right direction.

Figure 2:
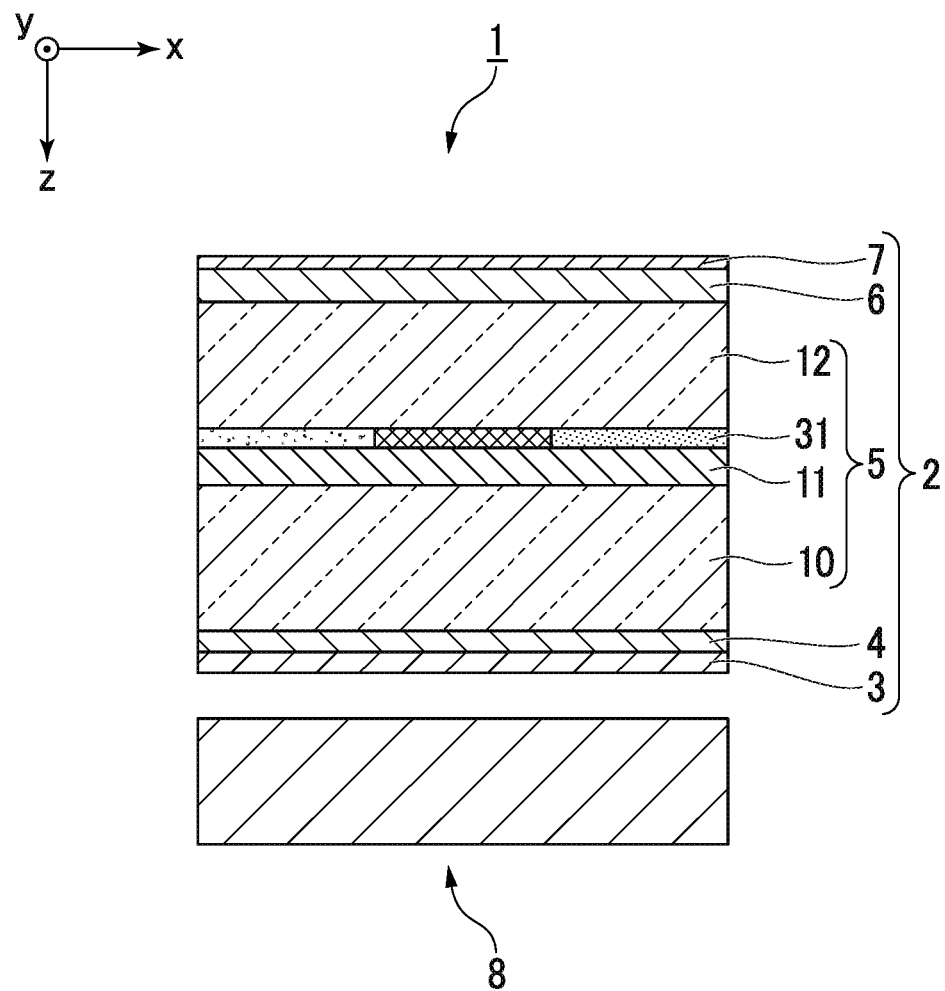
FIG. 2 is a cross-sectional view illustrating a configuration of the liquid crystal display device according to the first embodiment.

FIG. 2 is a cross-sectional view illustrating a configuration of the liquid crystal display device according to the first embodiment.

The liquid crystal display device 1 includes a liquid crystal panel 2 and a backlight 8 corresponding to dual view display. The liquid crystal panel 2 includes a first polarizing plate 3, a first phase difference film 4, a liquid crystal cell 5, a second phase difference film 6, and a second polarizing plate 7. Although the liquid crystal cell 5 is schematically illustrated in FIG. 2, its detailed structure will be described below.

A user views a display image of the liquid crystal display device 1 from the second polarizing plate 7 side. In the following description, a side on which the second polarizing plate 7 is disposed is referred to as a viewer side, and a side on which the backlight 8 is disposed is referred to as a back surface side. In the following description, an x-axis is defined as a horizontal direction of a screen of the liquid crystal display device 1. A y-axis is defined as a vertical direction of the screen of the liquid crystal display device 1. A z-axis is defined as a thickness direction of the liquid crystal display device 1. Further, the horizontal direction of the screen corresponds to the left-right direction when the user directly views the liquid crystal display device 1. The vertical direction of the screen corresponds to the up-down direction when the user directly views the liquid crystal display device 1.

In the liquid crystal display device 1 of the present embodiment, light emitted from a backlight 8 is modulated by the liquid crystal panel 2 and predetermined images, characters, and the like are displayed according to the modulated light.

Hereinafter, a specific configuration of the liquid crystal panel 2 will be described.

Here, a transmission type liquid crystal panel of an active matrix scheme will be described as an example. However, the liquid crystal panel 2 applicable to the present embodiment is not limited to a transmission type liquid crystal panel of an active matrix scheme. The liquid crystal panel 2 applicable to the present embodiment may be, for example, a liquid crystal panel of a semi-transmission type (for transmission/reflection combined use). Further, the liquid crystal panel 2 may be a liquid crystal panel of a simple matrix scheme in which each pixel does not have a switching thin film transistor. Hereinafter, thin film transistor is abbreviated to TFT.

Figure 3:
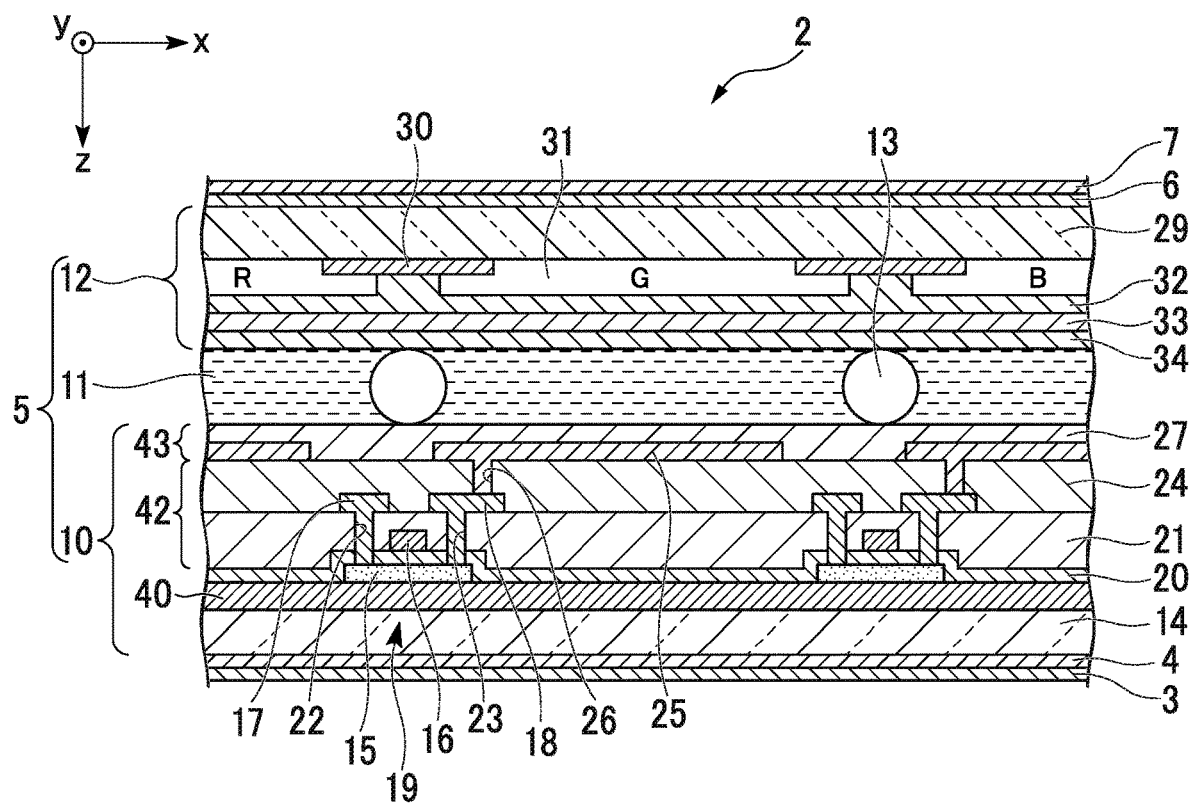
FIG. 3 is a longitudinal sectional view of a liquid crystal panel.

FIG. 3 is a vertical sectional view of the liquid crystal panel.

As illustrated in FIG. 3, the liquid crystal cell 5 constituting the liquid crystal panel 2 includes a TFT element substrate 10, a color filter substrate 12, and a liquid crystal layer 11. The TFT element substrate 10 functions as a switching element substrate. The color filter substrate 12 is disposed facing the TFT element substrate 10. The liquid crystal layer 11 is sandwiched between the TFT element substrate 10 and the color filter substrate 12.

The liquid crystal layer 11 is enclosed in a space surrounded by the TFT element substrate 10, the color filter substrate 12, and a frame-like sealing member (not illustrated). The sealing member bonds the TFT element substrate 10 to the color filter substrate 12 with a predetermined gap therebetween.

The liquid crystal panel 2 according to the present embodiment performs display in a vertical alignment (VA) mode. Liquid crystal having negative dielectric anisotropy is used for the liquid crystal layer 11. A spacer 13 is disposed between the TFT element substrate 10 and the color filter substrate 12. The spacer 13 is a spherical or columnar member. The spacer 13 makes a distance between the TFT element substrate 10 and the color filter substrate 12 constant.

The TFT element substrate 10 includes a transparent substrate (a first substrate) 14, a barrier layer 40, a TFT element layer 42, and a pixel electrode layer 43. The barrier layer 40, the TFT element layer 42, and the pixel electrode layer 43 are laminated in this order on a transparent substrate 14. Details of the barrier layer 40 will be described below.

The barrier layer 40 is formed on a front surface (a surface) 14a of the transparent substrate 14 constituting the TFT element substrate 10. On the surface of the barrier layer 40 at the liquid crystal layer 11 side, a TFT 19 having a semiconductor layer 15, a gate electrode 16, a source electrode 17, a drain electrode 18 and the like is formed. As the transparent substrate 14, for example, a glass substrate can be used. The TFT 19 according to the present embodiment functions as a switching element provided in each pixel.

On the transparent substrate 14, the semiconductor layer 15 is formed. The semiconductor layer 15 is made of, for example, a quaternary mixed crystal semiconductor material containing indium (In), gallium (Ga), zinc (Zn), and oxygen (O). As the material of the semiconductor layer 15, besides an In—Ga—Zn—O based quaternary mixed crystal semiconductor, continuous grain silicon (CGS), low temperature poly-silicon (LPS), and α-Si (amorphous silicon) may be used.

On the transparent substrate 14, a gate insulating film 20 is formed so that the semiconductor layer 15 is covered therewith.

As a material of the gate insulating film 20, for example, a silicon oxide film, a silicon nitride film, a laminated film thereof, or the like is used.

On the gate insulating film 20, a gate electrode 16 is formed facing the semiconductor layer 15. As a material of the gate electrode 16, for example, a laminated film of tungsten (W)/tantalum nitride (TaN), molybdenum (MO), titanium (Ti), aluminum (Al), or the like is used.

A first interlayer insulating film 21 is formed on the gate insulating film 20 so that the gate electrode 16 is covered therewith. As a material of the first interlayer insulating film 21, for example, a silicon oxide film, a silicon nitride film, a laminated film thereof, or the like is used.

On the first interlayer insulating film 21, a source electrode 17 and a drain electrode 18 are formed.

In the first interlayer insulating film 21 and the gate insulating film 20, a contact hole 22 and a contact hole 23 are formed penetrating through the first interlayer insulating film 21 and the gate insulating film 20.

The source electrode 17 is connected to a source region of the semiconductor layer 15 via the contact hole 22. The drain electrode 18 is connected to a drain region of the semiconductor layer 15 via the contact hole 23. As materials of the source electrode 17 and the drain electrode 18, conductive materials similar to that of the gate electrode 16 described above are used.

A second interlayer insulating film 24 is formed on the first interlayer insulating film 21 so that the source electrode 17 and the drain electrode 18 are covered therewith. As the material of the second interlayer insulating film 24, a material similar to that of the first interlayer insulating film 21 described above or an organic insulating material is used.

On the second interlayer insulating film 24, a pixel electrode 25 is formed. In the second interlayer insulating film 24, a contact hole 26 is formed penetrating through the second interlayer insulating film 24. The pixel electrode 25 is connected to the drain electrode 18 via the contact hole 26. The pixel electrode 25 is connected to the drain region of the semiconductor layer 15 with the drain electrode 18 as a relaying electrode.

As a material of the pixel electrode 25, for example, a transparent conductive material such as indium tin oxide (ITO) or indium zinc oxide (IZO) is used.

According to this configuration, when a scanning signal is supplied through a gate bus line and the TFT 19 is turned on, an image signal supplied to the source electrode 17 through a source bus line is supplied to the pixel electrode 25 through the semiconductor layer 15 and the drain electrode 18. Also, a top gate type TFT illustrated in FIG. 2 or a bottom gate type TFT may be used as the form of the TFT 19.

A first alignment film 27 is formed on the entire surface of the second interlayer insulating film 24 so that the pixel electrode 25 is covered therewith. The first alignment film 27 has an alignment regulating force for vertically aligning liquid crystal molecules constituting the liquid crystal layer 11. In the present embodiment, an alignment treatment is performed on the first alignment film 27 by using optical alignment technology. That is, in the present embodiment, an optical alignment film is used as the first alignment film 27.

On the other hand, a black matrix 30, a color filter 31, a planarization layer 32, a counter electrode 33, and a second alignment film 34 are sequentially formed on the surface of the transparent substrate (a second substrate) 29 constituting the color filter substrate 12 at the liquid crystal layer 11 side.

The black matrix 30 has a function of blocking the transmission of light in an inter-pixel region. The black matrix 30 is formed of, for example, a metal such as chromium (Cr) or a multilayer film of Cr/oxide Cr or a photoresist in which carbon particles are dispersed in a photosensitive resin.

The color filter 31 includes a pigment of any one of red (R), green (G), and blue (B) dyes for each of different subpixels constituting one pixel. The color filter 31 of any one of R, G, and B is disposed facing one pixel electrode 25 on the TFT element substrate 10. The color filter 31 may have a multi-color configuration of three or more colors of R, G, and B. For example, the color filter 31 may have a four-color configuration to which yellow (Y) is added, a four-color configuration to which white (W) is added, or a six-color configuration to which yellow (Y), cyan (C) and magenta (M) are added.

The planarization layer 32 includes an insulating film with which the black matrix 30 and the color filter 31 are covered. The planarization layer 32 has a function of performing planarization by alleviating a level difference formed by the black matrix 30 and the color filter 31.

The counter electrode 33 is formed on the planarization layer 32. As the material of the counter electrode 33, a transparent conductive material such as indium tin oxide (ITO) or indium zinc oxide (IZO) is used as in the pixel electrode 25.

The second alignment film 34 is formed on the entire surface of the counter electrode 33. The second alignment film 34 has an alignment regulating force for vertically aligning liquid crystal molecules constituting the liquid crystal layer 11. In the present embodiment, an alignment treatment is performed on the second alignment film 34 by using optical alignment technology. That is, in the present embodiment, an optical alignment film is used as the second alignment film 34.

On the rear surface (backlight 8) side of the liquid crystal cell 5, a first phase difference film 4 and a first polarizing plate 3 are provided. The first phase difference film 4 is provided to compensate for the phase difference of light and is provided on a back surface of the transparent substrate 14. The first polarizing plate 3 is provided on a back surface of the first phase difference film 4 (on a surface of the first phase difference film 4 opposite the liquid crystal cell 5). The first polarizing plate 3 functions as a polarizer for controlling a polarization state of light incident on the liquid crystal cell 5.

At the viewer side of the liquid crystal cell 5, a second phase difference film 6 and a second polarizing plate 7 are provided. The second phase difference film 6 is provided to compensate for the phase difference of the light and is provided on a front surface of the transparent substrate 29. The second polarizing plate 7 is provided on a front surface of the second phase difference film 6 (a surface of the second phase difference film 6 opposite the liquid crystal cell 5). The second polarizing plate 7 functions as a polarizer for controlling the transmission state of light emitted from the liquid crystal cell 5. The transmission axis of the first polarizing plate 3 and the transmission axis of the second polarizing plate 7 are disposed under a cross-nicol condition.

As the phase difference film (the first phase difference film 4 or the second phase difference film 6) according to the present embodiment, for example, a TAC film is used.

Figure 4:
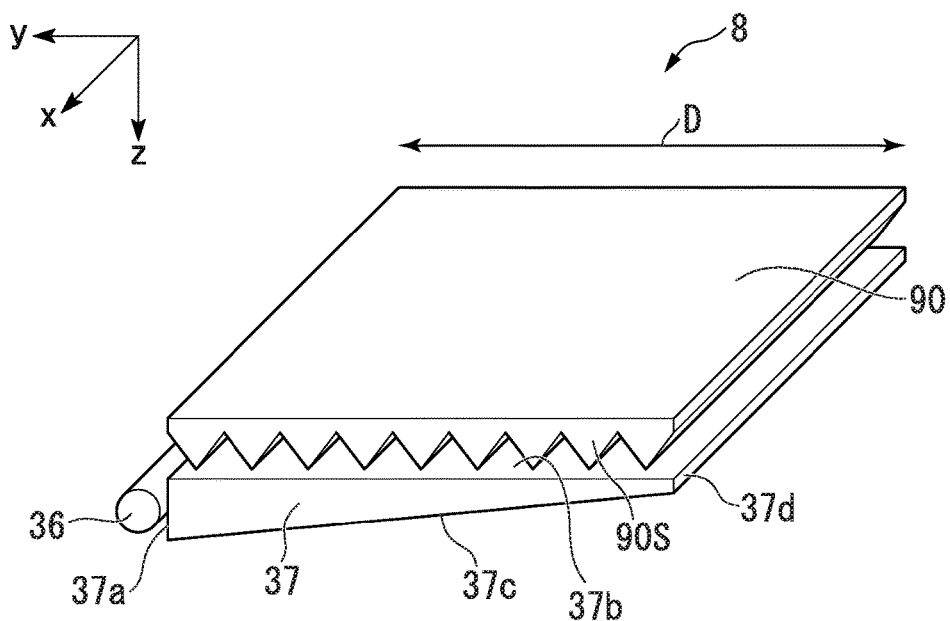
FIG. 4 is a perspective view illustrating a configuration of a backlight according to the first embodiment.

FIG. 4 is a perspective view illustrating the configuration of the backlight of the first embodiment.

As illustrated in FIG. 4, the backlight 8 includes a light source 36, a light guide membrane 37, and a prism sheet 90. The light source 36 is disposed on an end surface 37a of the light guide membrane 37. As the light source 36, for example, a light-emitting diode, a cold cathode tube, or the like is used. The light guide membrane 37 is made of, for example, an acrylic resin or the like.

The backlight 8 according to the present embodiment is an edge light type backlight.

The light source 36 emits light toward the end surface 37a of the light guide membrane 37. The light guide membrane 37 has a function of guiding light emitted from the light source 36 to the liquid crystal panel 2. Specifically, the light guide membrane 37 causes light incident from the end surface 37a to be emitted from an upper surface 37b which is a light emission surface while causing the light to be internally propagated.

As a material of the light guide membrane 37, for example, a resin material such as an acrylic resin is used.

The prism sheet 90 includes a plurality of convex parts 90S which have a triangular shape in a cross section cut in a plane perpendicular to the end surface 37a of the light guide membrane 37 and perpendicular to the upper surface 37b of the light guide membrane 37 (a yz plane) as a structural membrane and which forms convex parts extending in a direction parallel to the end surface 37a and directed to the upper surface 37b of the light guide membrane 37, on a surface opposite the light guide membrane 37. The prism sheet 90 is called a so-called turning lens sheet. When the light from the upper surface 37b of the light guide membrane 37 is incident, the prism sheet 90 causes light to be emitted by changing a traveling direction of the light to a direction close to a normal direction of the liquid crystal panel 2.

Although not illustrated in the present embodiment, a reflection sheet is disposed on a lower surface 37c of the light guide membrane 37. The reflection sheet causes the light emitted from the lower surface 37c of the light guide membrane 37 to be reflected and causes the light to be incident from the lower surface 37c of the light guide membrane 37 again.

The backlight 8 is a so-called directional backlight having directivity by controlling the emission direction of light. Specifically, the thickness of the light guide membrane 37 gradually decreases from the end surface 37a on which the light source 36 is disposed to an end surface 37d on the opposite side. That is, the upper surface 37b and the lower surface 37c of the light guide membrane 37 are not parallel to each other and the shape of the light guide membrane 37 when viewed from the side is a wedge shape. The light incident from the end surface 37a of the light guide membrane 37 internally travels in the y-axis direction while repeating reflection between the upper surface 37b and the lower surface 37c of the light guide membrane 37. Assuming that the light guide membrane is a parallel flat plate, an incident angle of light on the upper surface 37b and the lower surface 37c of the light guide membrane 37 is constant regardless of how many times reflection is repeated. On the other hand, if the light guide membrane 37 is wedge-shaped as in the present embodiment, the incident angle decreases every time light is reflected once on the upper surface 37b and the lower surface 37c of the light guide membrane 37.

At this time, for example, assuming that a refractive index of the acrylic resin constituting the light guide membrane 37 is 1.5 and the refractive index of air is 1.0, a critical angle on the upper surface 37b of the light guide membrane 37, that is, a critical angle at an interface between an acrylic resin constituting the light guide membrane 37 and air becomes about 42° according to Snell's law. When light is incident on the upper surface 37b immediately after the light is incident on the light guide membrane 37, a total reflection condition is satisfied while the incident angle of the light on the upper surface 37b is greater than 42° which is the critical angle, so that the light is totally reflected by the upper surface 37b. Thereafter, at a point in time when the light is being repeatedly subjected to total reflection between the upper surface 37b and the lower surface 37c and an incidence angle of light on the upper surface 37b becomes less than 42° which is the critical angle, the total reflection condition is not satisfied and the light is emitted to an external space. Therefore, the light is emitted to the upper surface 37b of the light guide membrane 37 at a substantially constant emission angle. In this manner, the backlight 8 has a narrow light distribution within the yz plane and has directivity in the yz plane. On the other hand, the backlight 8 has a wider light distribution within the xz plane than the light distribution within the yz plane without having directivity within the xz plane.

In the present embodiment, the backlight 8 may not have directivity. For example, a backlight in which moderate directivity is set to a certain extent by controlling the direction of light emission may be used as the backlight 8 according to the present embodiment.

Next, the barrier layer 40, which is a characteristic part of the present invention, will be described in detail.

Figure 5:
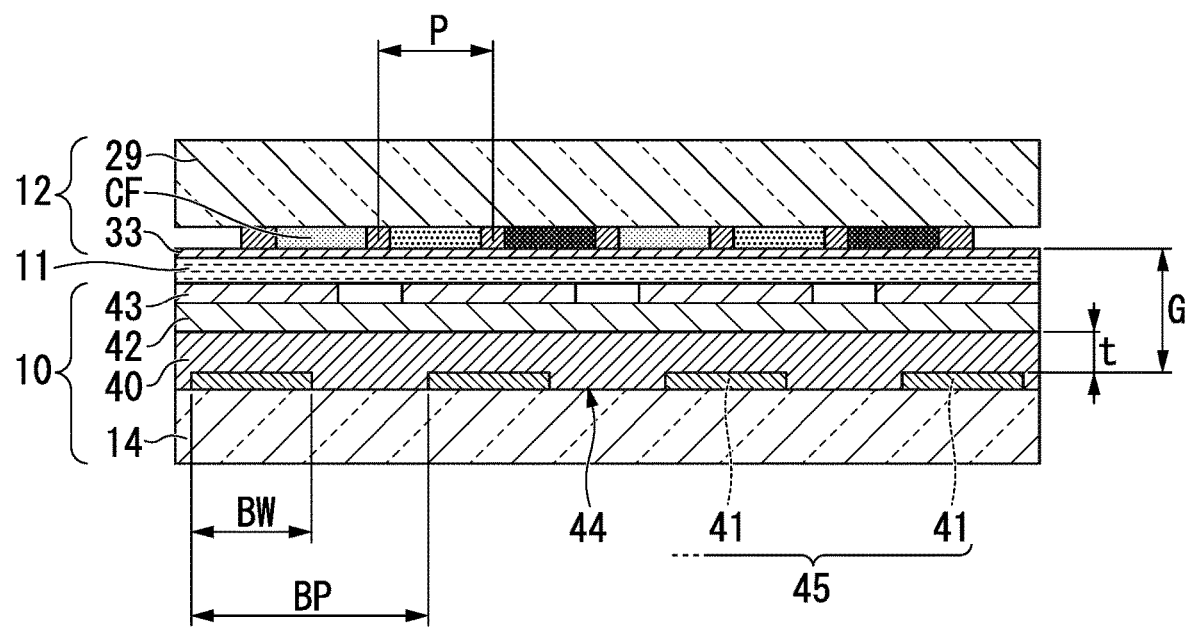
FIG. 5 is a view mainly illustrating a configuration of a barrier layer in a liquid crystal panel.

FIG. 5 is a view mainly illustrating the configuration of the barrier layer 40 in the liquid crystal panel.

The barrier layer 40 has the barrier pattern 45 patterned and formed on the surface 14a of the transparent substrate 14. As illustrated in FIG. 1, the barrier pattern 45 has a plurality of barriers (not illustrated) 41 extending in the display area A in the up-down direction (the y-direction) and disposed in a stripe shape at a predetermined pitch in the left-right direction (the x-direction). A width BW of the barrier part 41 in an arrangement direction is wider than the pixel pitch of the display area A in the left-right direction (the x-direction). As a material for forming the barrier pattern 45, a black matrix material having a strong light absorbing effect (light blocking effect) is used.

The barrier layer 40 further includes an intermediate layer 44. The intermediate layer 44 is formed on the surface 14a of the transparent substrate 14 so that the barrier pattern 45 is covered therewith. The intermediate layer 44 functions as an adjustment layer for adjusting a distance between the barrier pattern 45 and the color filter CF (hereinafter also referred to as a gap G) by changing a thickness of the intermediate layer 44.

Next, an outline of dimensions of the liquid crystal panel 2 according to this embodiment will be described.

Number of pixels of the liquid crystal panel 2: 5760 pixels×2160 pixels

Pixel pitch P: 16.9 μm×50.7 μm

In the present embodiment, a barrier pitch BP in the barrier pattern 45 is twice the pixel pitch and is obtained from the following Equation (1).

The plurality of barrier parts 41 constituting the barrier pattern 45 are arranged in the display area A in the left-right direction (the x-direction). Thus, the barrier pitch BP is calculated using a plurality of pixel pitches P arranged in the same direction.

$$BP = 2 \times P = 16.9 \text{ μm} \times 2 = 33.8 \text{ μm} \tag{1}$$

Also, in the present embodiment, the barrier pitch BP in the barrier pattern 45 is twice the pixel pitch, but may be 1.5 to 2.5 times the pixel pitch.

Also, the barrier pattern 45 has a plurality of barrier parts 41. The width BW of the barrier part 41 in the arrangement direction is formed with a dimension larger than the pixel pitch P.

A thickness t of the intermediate layer (the adjustment layer) 44 constituting the barrier layer 40 is 20 μm. Here, the thickness t of the intermediate layer 44 is a layer thickness from which the part embedded in the barrier pattern 45 is excluded and is a distance from the surface of the barrier pattern 45 to the surface of the intermediate layer 44.

Next, a method of manufacturing the liquid crystal display device according to the first embodiment will be described.

FIGS. 6A to 6D are cross-sectional views illustrating a process of manufacturing the liquid crystal display device according to the first embodiment.

Figure 6A:
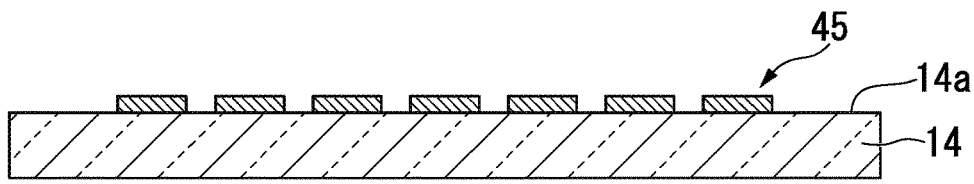
FIG. 6A is a cross-sectional view illustrating a process of manufacturing the liquid crystal display device according to the first embodiment.

First, as illustrated in FIG. 6A, the barrier pattern 45 is formed on the surface 14a of the transparent substrate 14.

Figure 6B:
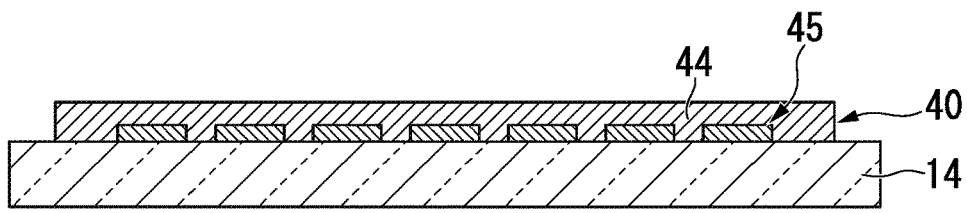
FIG. 6B is a cross-sectional view illustrating a process of manufacturing the liquid crystal display device according to the first embodiment.

Next, as illustrated in FIG. 6B, the intermediate layer 44 is formed on the surface 14a of the transparent substrate 14 so that the barrier pattern 45 is covered therewith.

Figure 6C:
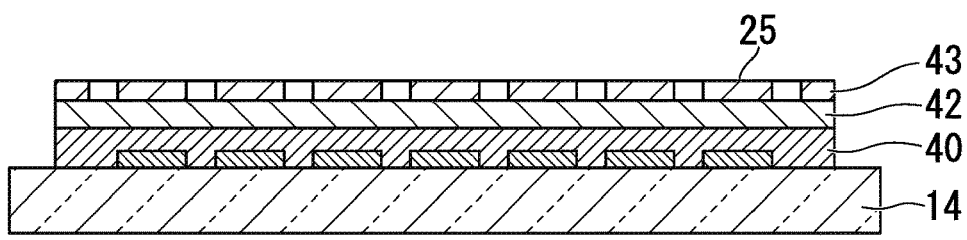
FIG. 6C is a cross-sectional view illustrating a process of manufacturing the liquid crystal display device according to the first embodiment.

Next, as illustrated in FIG. 6C, the TFT element layer 42 is formed on the intermediate layer 44. Thereafter, the pixel electrode layer 43 having a plurality of pixel electrodes 25 is formed on the TFT element layer 42 with a transparent electrode material such as ITO. In this manner, the TFT element substrate 10 is formed.

Figure 6D:
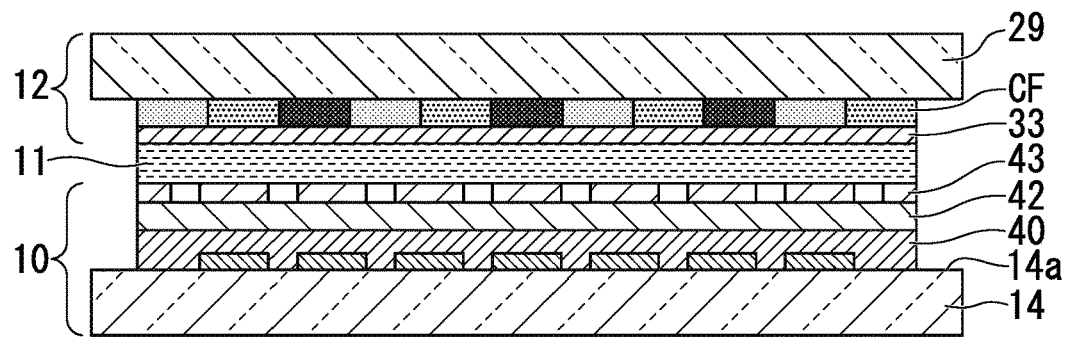
FIG. 6D is a cross-sectional view illustrating a process of manufacturing the liquid crystal display device according to the first embodiment.

Next, as illustrated in FIG. 6D, the color filter substrate 12 having the color filter CF and the counter electrode 33 is separately formed on a surface side of the transparent substrate 29, and the color filter substrate 12 is disposed facing the TFT element substrate 10 via the sealing member (not illustrated).

Next, the space surrounded by the TFT element substrate 10, the color filter substrate 12, and the sealing member (not illustrated) is filled with the liquid crystal material and the liquid crystal layer 11 is formed. A cell thickness is 3.2 μm.

In this manner, the liquid crystal cell 5 is completed.

Thereafter, the liquid crystal display device 1 of the present embodiment is completed by providing a phase difference film and a polarizing plate on the front and back sides of the liquid crystal cell 5.

Figure 13A:
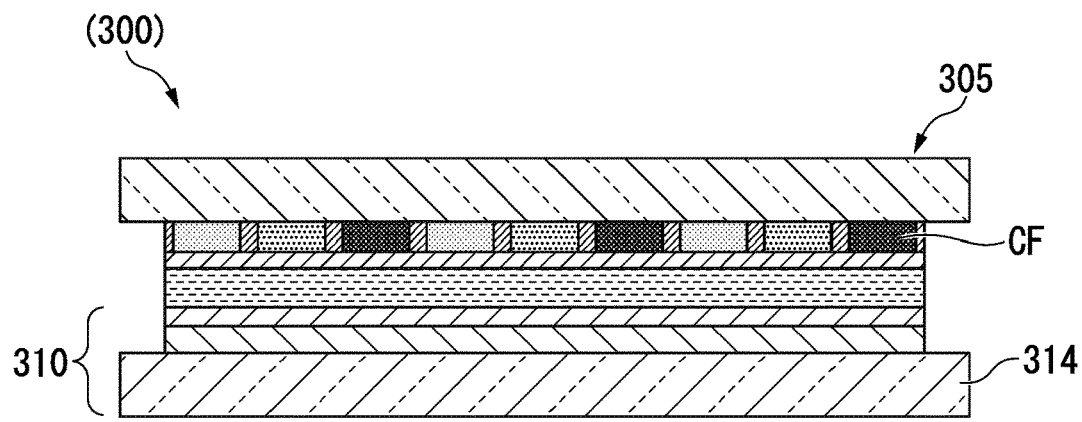
FIG. 13A is a view illustrating a method of manufacturing a conventional liquid crystal display device 300.
Figure 13B:
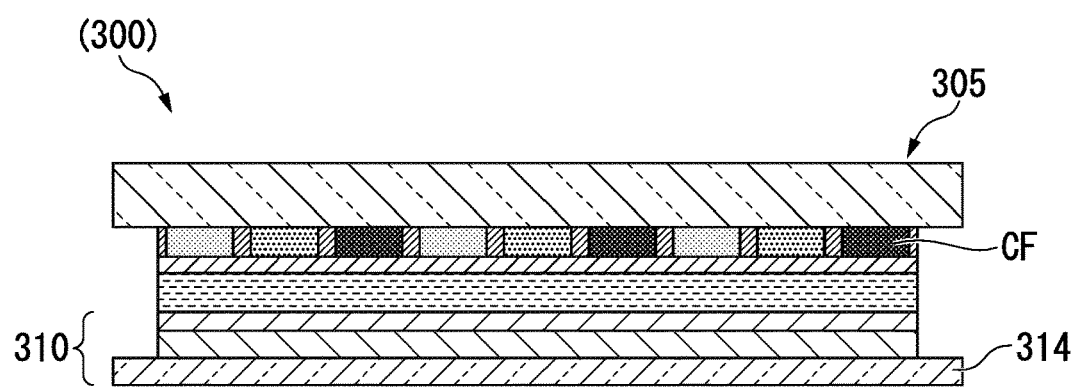
FIG. 13B is a view illustrating a method of manufacturing the conventional liquid crystal display device 300.
Figure 13C:
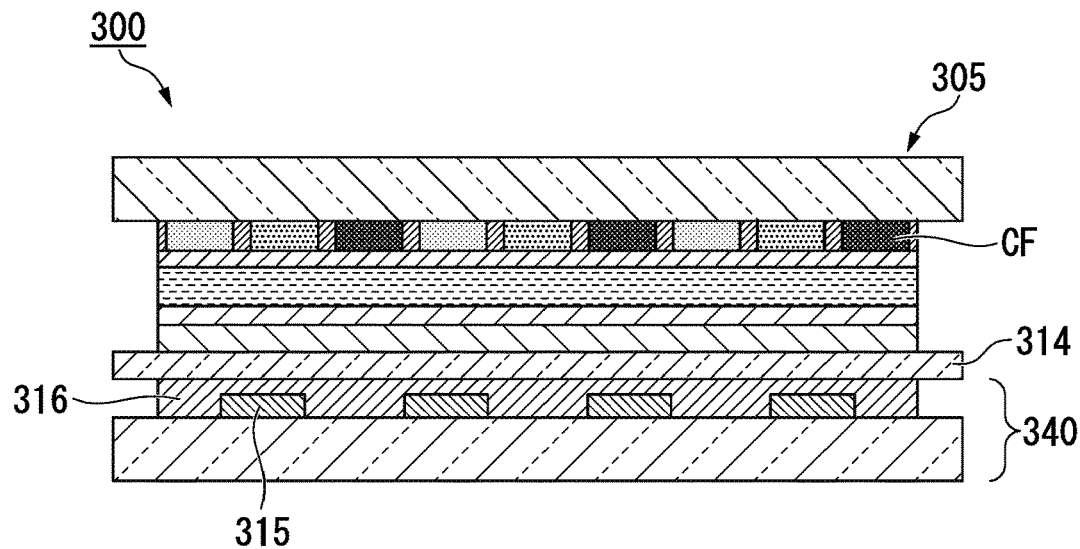
FIG. 13C is a view illustrating a method of manufacturing the conventional liquid crystal display device 300.

FIGS. 13A to 13C are views illustrating a method of manufacturing a conventional liquid crystal display device 300.

In the conventional liquid crystal display device 300, after a liquid crystal cell 305 is manufactured as illustrated in FIG. 13A, a transparent substrate 314 on a TFT substrate 310 side is etched as illustrated in FIG. 13B. After the transparent substrate 314 is thinned, a separately formed barrier substrate 340 is bonded on an outer surface thereof (FIG. 13C).

As illustrated in FIG. 13C, the barrier substrate 340 has the transparent substrate 314, a barrier pattern 315 formed on the transparent substrate, and a UV curable resin layer 316 with which the barrier pattern 315 is covered and is bonded to a liquid crystal cell 305 by the UV curable resin layer 316.

As described above, in the conventional configuration, in addition to the step of bonding the barrier substrate 340 to the liquid crystal cell 305, the step of performing an etching process on the liquid crystal cell 305 to avoid an increase in thickness due to bonding of the barrier substrate 340 was also necessary.

On the other hand, in a method of manufacturing the liquid crystal display device 1 according to the present embodiment, it is not necessary to provide the barrier substrate 340 separately from the liquid crystal cell 305 and it is also possible to eliminate the step of bonding the barrier substrate 340 to the liquid crystal cell 305 and the above-described etching processing step. Also, the mounting yield in the bonding step can be improved.

Next, a relationship between a pixel pitch P and a gap when a separation angle between the right and left images is 35° will be described. Here, as illustrated in FIG. 5, a gap G is a distance between a barrier pattern 45 and a color filter CF.

Figure 7:
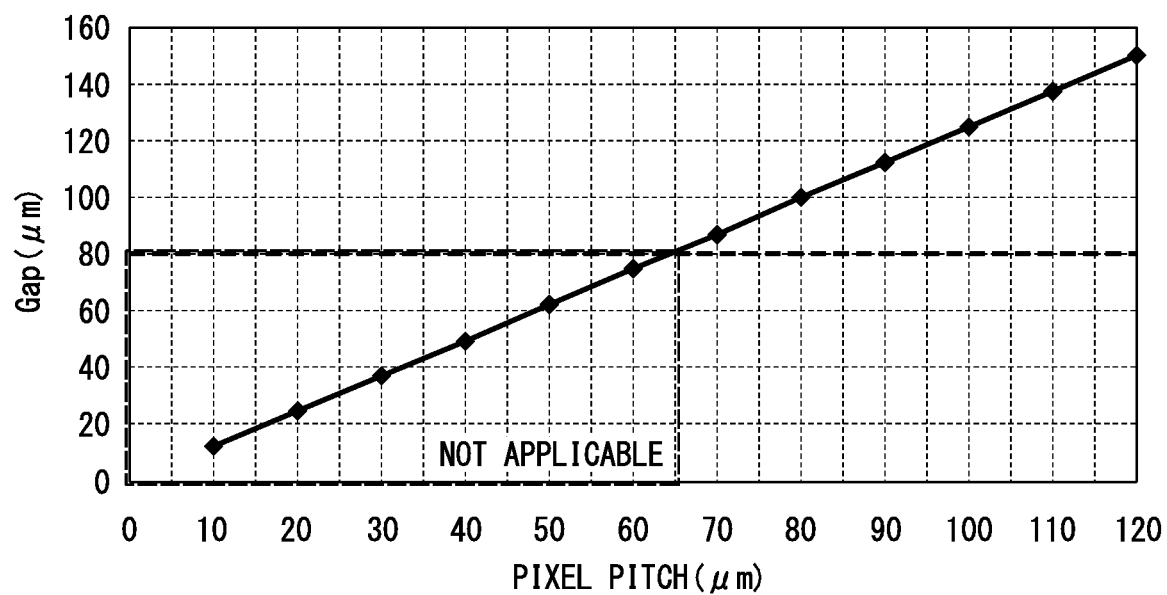
FIG. 7 is a view illustrating a relationship between a pixel pitch and a gap when a separation angle between right and left images is 35°.
Figure 8A:
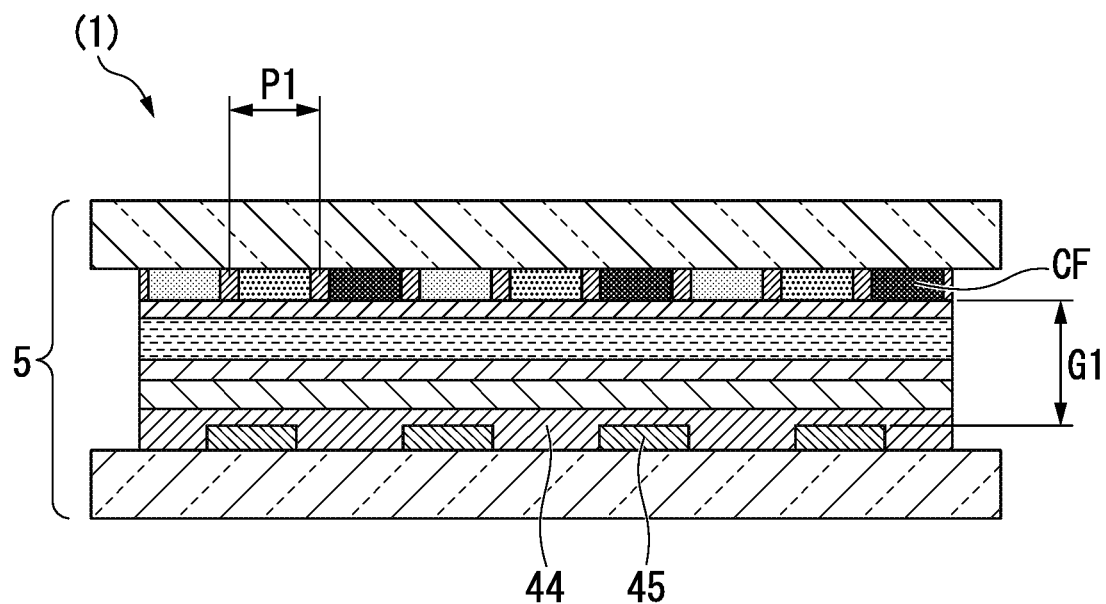
FIG. 8A is a view illustrating a gap of the liquid crystal display device according to the first embodiment.

FIG. 7 is a view illustrating the relationship between the pixel pitch and the gap when the separation angle between the left and right images is 35°. FIG. 8A is a view illustrating a gap of the liquid crystal display device according to the present embodiment, and FIG. 8B is a view illustrating a gap of a conventional liquid crystal display device.

Figure 8B:
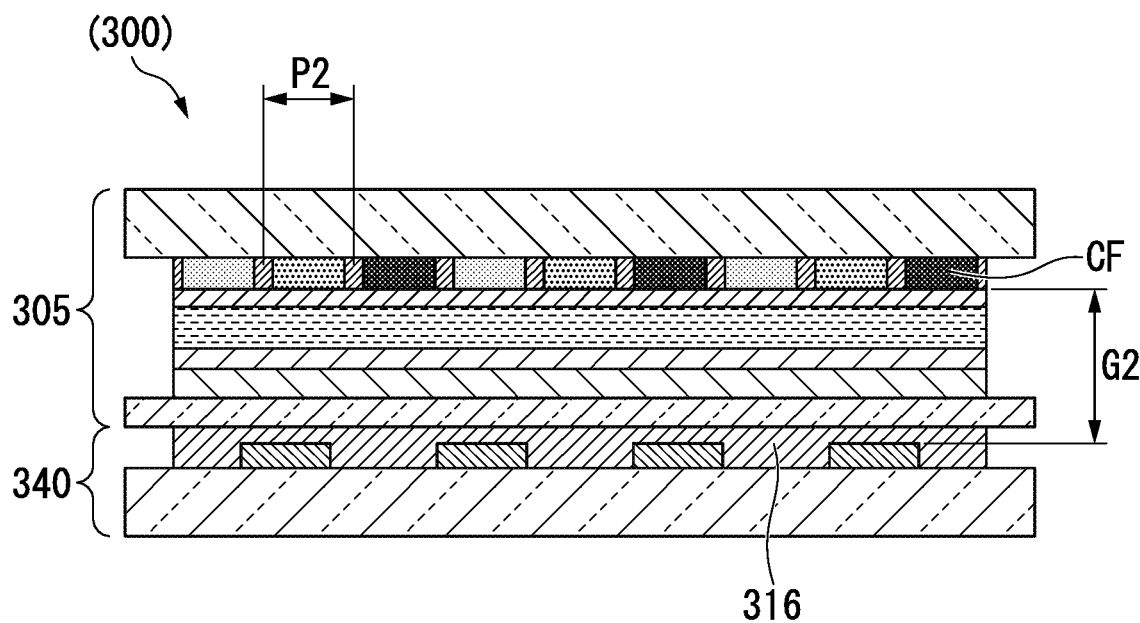
FIG. 8B is a view illustrating a gap of a conventional liquid crystal display device.

As illustrated in FIG. 8B, in the conventional liquid crystal display device 300, a lower limit of a thickness of the color filter CF is 50 μm and a lower limit of a thickness of the UV curable resin layer 316 for bonding the barrier substrate 340 to the liquid crystal cell 305 is 30 μm. These are constraints and thickness reduction and high definition are limited. As illustrated in FIG. 7, if the separation angle between the left and right images is 35°, a pixel pitch P2 is 65 μm and a lower limit of a gap G2 is 80 μm.

In the liquid crystal display device 1 according to the present embodiment, it is possible to further narrow the pixel pitch P1 (<P2) by disposing the barrier pattern 45 within the liquid crystal cell 5 and adjusting the above-described gap G1 according to the intermediate layer 44. In the present embodiment, as indicated by a frame-like dashed line in FIG. 7, it is also possible to apply a region which is not applicable to the conventional configuration.

As illustrated in FIG. 7, according to the configuration of the present embodiment, it is possible to reduce the gap G1 (<G2) to 80 μm or less and reduce the gap G1 (<G2) to 20 μm or less. It is also possible to make the pixel pitch P1 less than or equal to 65 μm, and it is possible to further achieve ultra-high definition display of 10 μm.

In the liquid crystal display device according to the present embodiment, because the barrier pattern 45 is provided within the liquid crystal cell 5 to form an in-cell, there is no need to separately provide the barrier substrate 340 as in the conventional case. Thereby, a panel configuration capable of implementing thickness reduction of the liquid crystal panel which was physically difficult in the conventional configuration is adopted.

Also, in the present embodiment, it is possible to adjust the distance between the color filter CF and the barrier pattern 45 by changing a film thickness of the intermediate layer 44 provided on the barrier pattern 45. In other words, because restrictions on the thickness of the glass substrate constituting the upper and lower transparent substrates 14 and 29 in the liquid crystal cell 5 can be eliminated, it is possible to contribute to thickness reduction of the entire device. By narrowing the liquid crystal cell 5 as described above, it is possible to cope with high-definition panel specifications.

Second Embodiment

Next, a second embodiment of the present invention will be described with reference to FIG. 9.

Figure 9:
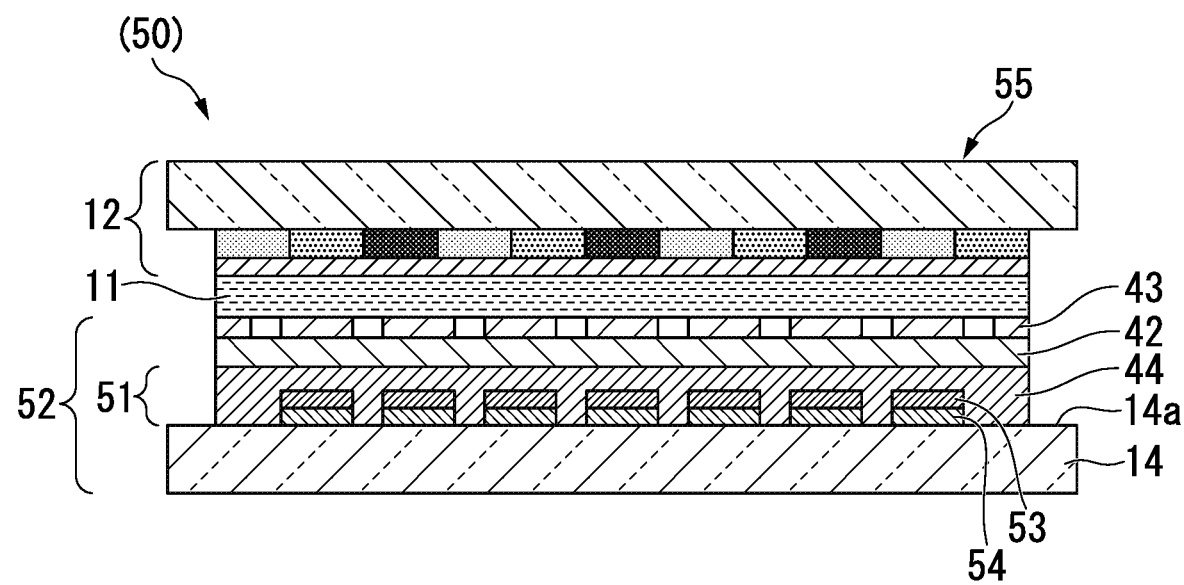
FIG. 9 is a plan view illustrating an overall configuration of a liquid crystal display device according to a second embodiment.

FIG. 9 is a plan view illustrating the overall configuration of a liquid crystal display device according to the second embodiment.

A basic configuration of a liquid crystal display device 50 according to the present embodiment shown below is approximately similar to that of the first embodiment, but is different from that of the first embodiment in terms of the configuration of a barrier layer 51. Consequently, in the following description, the configuration of the barrier layer 51 will be described in detail, and the description of common parts will be omitted. Also, in each drawing for use in description, the same reference signs are given to components in common with those of FIGS. 1 to 5.

A TFT element substrate 52 of the liquid crystal display device 50 according to the present embodiment includes the barrier layer 51 containing a first barrier pattern 54 having a light reflecting effect, a second barrier pattern 53 having a light absorbing effect, and an intermediate layer 44.

The second barrier pattern 53 is similar to the barrier pattern described in the above embodiment and includes a black matrix material having a strong light blocking effect. The first barrier pattern 54 is formed between the second barrier pattern 53 and a transparent substrate 14 and is formed of a metallic material having a strong reflecting effect. That is, the first barrier pattern 54 and the second barrier pattern 53 are laminated in this order on the transparent substrate 14.

The intermediate layer 44 is formed on the transparent substrate 14 with a predetermined film thickness in which the first barrier pattern 54 and the second barrier pattern 53 are covered therewith.

Also, although the second barrier pattern 53 according to the present embodiment has a light blocking effect, the present invention is not limited thereto. It is only necessary for the second barrier pattern 53 to have a weaker light reflecting effect than the first barrier pattern 54.

Next, a method of manufacturing the liquid crystal display device according to the first embodiment will be described.

FIGS. 10A to 10D are cross-sectional views illustrating a process of manufacturing the liquid crystal display device according to the first embodiment.

Figure 10A:
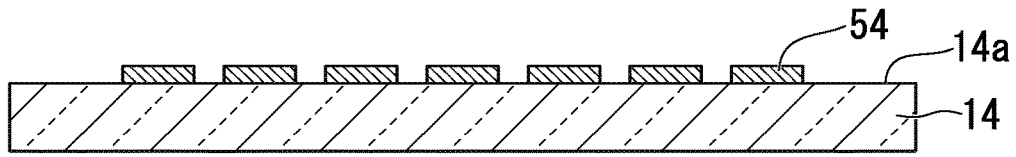
FIG. 10A is a cross-sectional view illustrating a process of manufacturing the liquid crystal display device according to the first embodiment.

First, as illustrated in FIG. 10A, the first barrier pattern 54 is formed of a metallic material on a surface 14a of the transparent substrate 14. Subsequently, the second barrier pattern 53 is formed on the first barrier pattern 54 with a black matrix material having a strong light blocking effect.

Figure 10B:
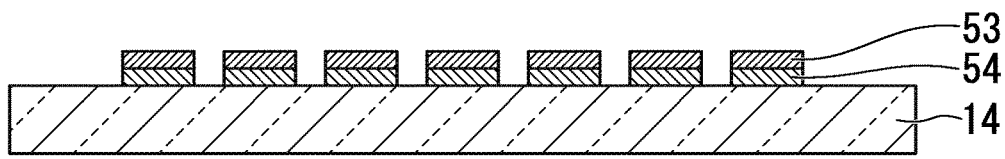
FIG. 10B is a cross-sectional view illustrating a process of manufacturing the liquid crystal display device according to the first embodiment.

Next, as illustrated in FIG. 10B, the intermediate layer 44 and the barrier layer 51 are formed on the transparent substrate 14 so that the first barrier pattern 54 and the second barrier pattern 53 are covered therewith.

Figure 10C:
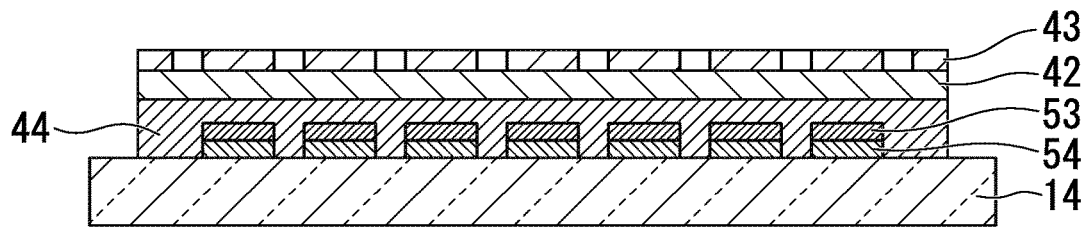
FIG. 10C is a cross-sectional view illustrating a process of manufacturing the liquid crystal display device according to the first embodiment.

Next, as illustrated in FIG. 10C, a TFT element layer 42 is formed on the intermediate layer 44. Thereafter, a pixel electrode layer 43 having a plurality of pixel electrodes formed of a transparent electrode material such as ITO is formed on the TFT element layer 42. In this manner, the TFT element substrate 52 is formed.

Figure 10D:
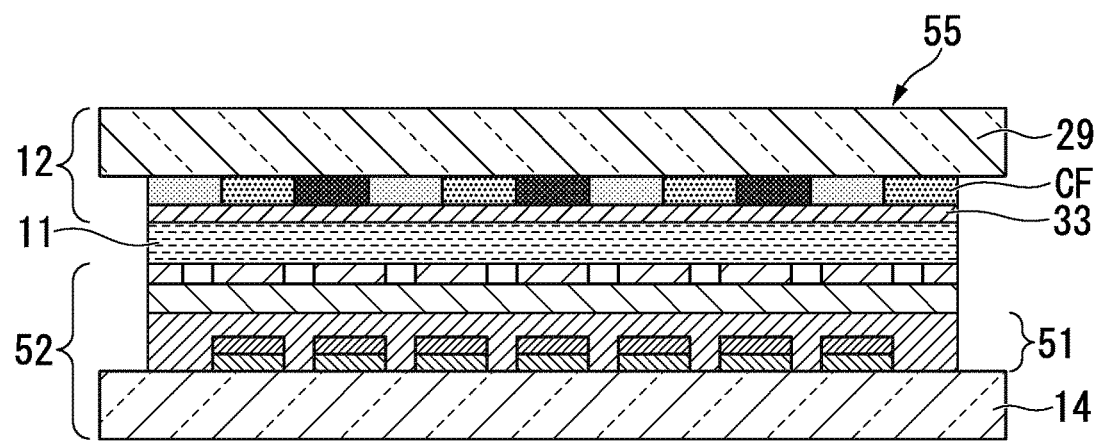
FIG. 10D is a cross-sectional view illustrating a process of manufacturing the liquid crystal display device according to the first embodiment.

Next, as illustrated in FIG. 10D, a color filter substrate 12 having a color filter CF and a counter electrode 33 is separately formed on a surface side of the transparent substrate 29, and the color filter substrate 12 is disposed facing the TFT element substrate 52 via a sealing member (not illustrated).

Next, a space surrounded by the TFT element substrate 52, the color filter substrate 12, and the sealing member (not illustrated) is filled with the liquid crystal material and a liquid crystal layer 11 is formed.

In this manner, a liquid crystal cell 55 is completed. Thereafter, the liquid crystal display device 50 is obtained by bonding a phase difference film and a polarizing plate to front and back sides of the liquid crystal cell 55.

Figure 11:
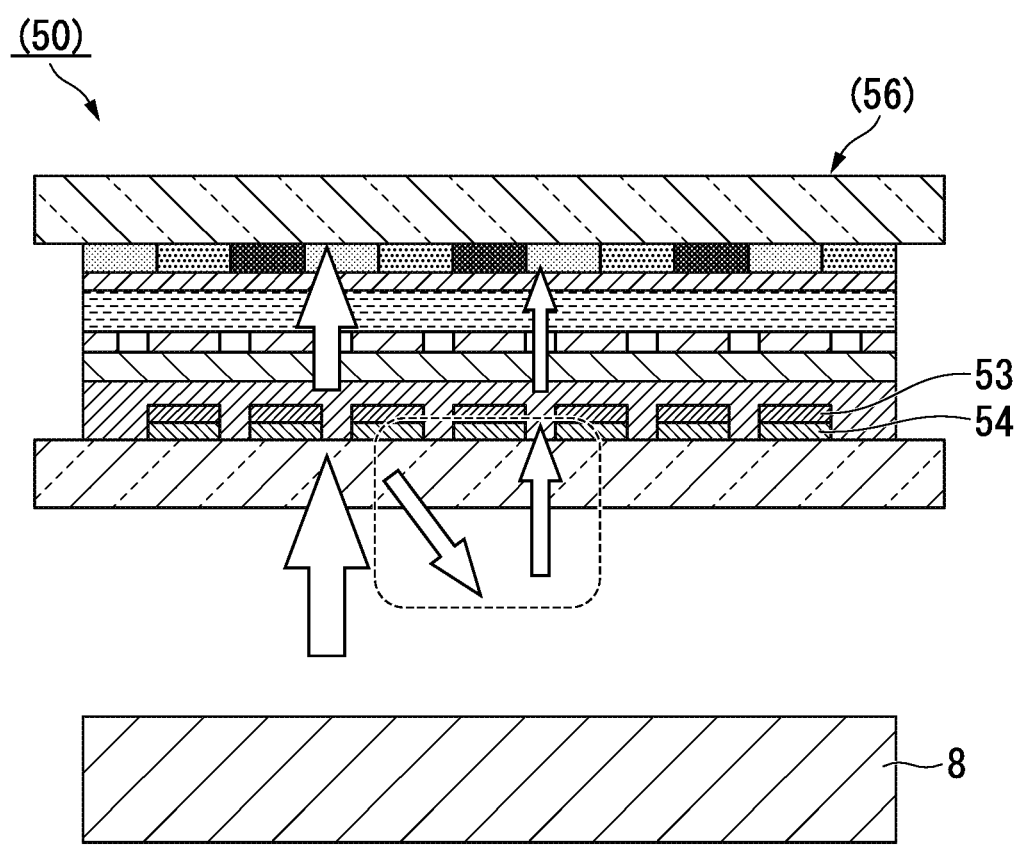
FIG. 11 is a view illustrating an operation of the liquid crystal display device according to a second embodiment.
Figure 12:
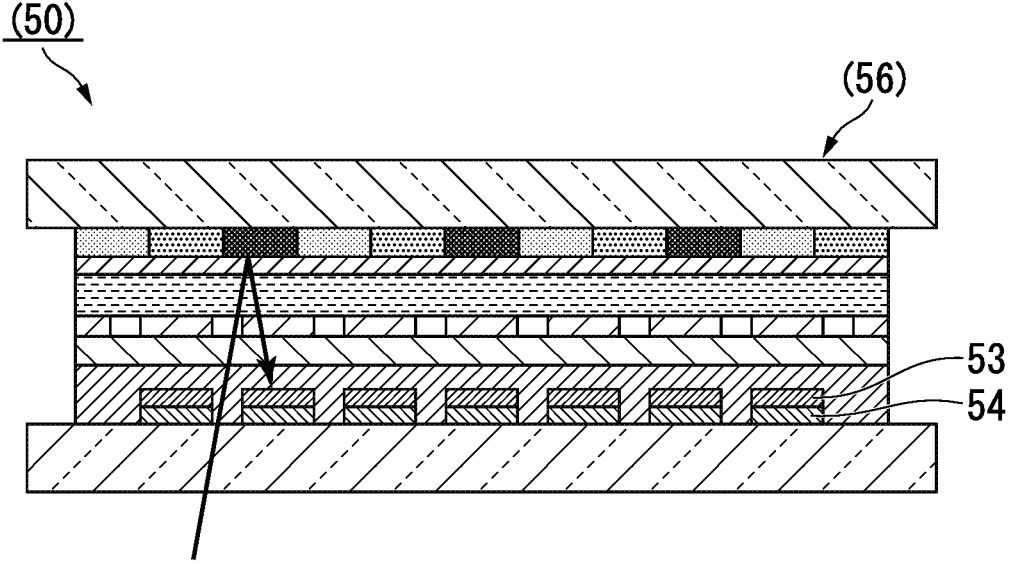
FIG. 12 is a view illustrating an operation of the liquid crystal display device according to the second embodiment.
Figure 12:

FIGS. 11 and 12 are views illustrating an operation of the liquid crystal display device according to the second embodiment.

As illustrated in FIG. 11, in the liquid crystal display device 50 according to the present embodiment, light passing through the first barrier pattern 54 and the second barrier pattern 53 from light emitted from a backlight 8 is emitted to a viewer side. On the other hand, light incident on the first barrier pattern 54 from light emitted from the backlight 8 is reflected toward the backlight side without being absorbed by the first barrier pattern 54. The reflected light returns to the inside of the backlight 8 and is re-emitted to a liquid crystal panel 56 side. From such recurring light, the light can be reused in proportion to the light passing through the first barrier pattern 54 which contributes to high luminance.

Also, as illustrated in FIG. 12, stray light reflected by the color filter substrate 12 from light passing through the first barrier pattern 54 is absorbed by the second barrier pattern 53. Thereby, because it is possible to prevent the stray light within the liquid crystal panel 56 from being reflected by the second barrier pattern 53 toward the viewer side and re-emitted to the viewer side, crosstalk can be minimized.

Also, because the reflection of external light from the viewer side can also be minimized by the second barrier pattern 53, high-quality dual view display can be achieved.

Also, in the present embodiment, because the second barrier pattern 53 has a light absorbing effect, the light incident on the second barrier pattern 53 is not reflected and emitted toward the viewer side, but the second barrier pattern 53 may have a light reflecting effect as long as the reflectance is of such a degree that light is not emitted from the liquid crystal panel. As described above, for example, it is desirable that the second barrier pattern 53 have a weaker light reflecting effect than the first barrier pattern 54.

Although the preferred embodiments of the present invention have been described above with reference to the accompanying drawings, it goes without saying that the present invention is not limited to such examples. Those skilled in the art will appreciate that various changes or modifications can be conceived within the scope of the technical idea described in the claims, and it is understood that they also naturally belong to the technical scope of the present invention. The configurations of the embodiments may be combined as appropriate.

DESCRIPTION OF THE REFERENCE SYMBOLS 1, 50, 300 Liquid crystal display device
P, P1, P2 Pixel pitch
10 TFT substrate
11 Liquid crystal layer
12 Color filter substrate
14 Transparent substrate (first substrate)
19 TFT
25 Pixel electrode
28 Pixel
29 Transparent substrate (second substrate)
31, CF color filter
33 Counter electrode
40, 51 Barrier layer
41 Barrier part
42 TFT element layer
44 Intermediate layer
44 Intermediate layer (adjustment layer)
45, 315 Barrier pattern
53 First barrier pattern (light blocking layer)
BP Barrier pitch
BW Width of barrier part

The invention claimed is:

1. A liquid crystal display device, comprising:
a first substrate;
a second substrate disposed facing the first substrate;
a liquid crystal layer disposed between the first substrate and the second substrate;
a barrier layer formed on a surface side of the first substrate;
a TFT element layer formed on the barrier layer;
a pixel electrode laminated on the TFT element layer;
a color filter disposed on a liquid crystal layer side of the second substrate; and
a counter electrode disposed between the color filter and the liquid crystal layer,
wherein the barrier layer includes a barrier pattern formed on the first substrate and an intermediate layer with which the barrier pattern is covered,
the barrier pattern has a plurality of barrier parts arranged with a predetermined pitch,
a width of each of the plurality of barrier parts in an arrangement direction of the plurality of barrier parts is wider than a pixel pitch, and
the predetermined pitch is substantially twice the pixel pitch.

2. The liquid crystal display device according to claim 1, wherein the intermediate layer functions as an adjustment layer configured to adjust a distance between the color filter and the barrier pattern.

3. The liquid crystal display device according to claim 1, wherein the barrier pattern has a light absorbing effect or a light reflecting effect.

4. The liquid crystal display device according to claim 3, wherein
the barrier layer comprises:
a first barrier pattern having a light reflecting effect; and
a second barrier pattern having a weaker light reflecting effect than the first barrier pattern, and
wherein the first barrier pattern and the second barrier pattern are laminated in this order on the first substrate.

* * * * *